United States Patent [19]

Harris

[11] Patent Number: 4,753,279

[45] Date of Patent: Jun. 28, 1988

[54] ROLLER SUPPORT ATTACHMENT FOR WORK BENCHES

[76] Inventor: Alan S. Harris, 151 Arbor Ln., Moss Beach, Calif. 94038

[21] Appl. No.: 83,523

[22] Filed: Aug. 7, 1987

[51] Int. Cl.[4] .............................................. B25H 1/02
[52] U.S. Cl. ................................... 144/287; 83/471.2; 193/42; 269/901
[58] Field of Search ................. 193/42; 144/1 R, 3 R, 144/286 R, 286 A, 287; 83/471.3, 471.2; 269/281, 901, 904, 905; 108/135

[56] References Cited

U.S. PATENT DOCUMENTS

| | | | |
|---|---|---|---|
| 1,658,826 | 2/1928 | Yerk et al. | 144/287 |
| 2,766,788 | 10/1956 | Kahn | 144/286 R |
| 4,248,115 | 2/1981 | Brodbeck et al. | 144/287 |
| 4,328,846 | 5/1982 | Hanson | 144/287 |

Primary Examiner—W. Donald Bray
Attorney, Agent, or Firm—John A. Bucher

[57] ABSTRACT

An adjustable roller support attachment is disclosed for mounting on a clamping type work bench, available for example, under the trademark WORKMATE, for facilitate the handling of long stock in stationary power tools, the roller support attachment including a support having a yoke portion for rotatably mounting a roller and a wide, elongated base for clamping engagement by vise jaws of the work bench, a stabilizing element or collar surrounding the support base with a stabilizing surface for resting on an upper surface of the vise jaws, and a screw element or the like for releasably securing the stabilizing element to the support base in order to both stabilize the support and roller on the work bench while also facilitating height adjustment of te support attachment on the work bench for aligning the roller with a portion of the stationary power tool.

9 Claims, 1 Drawing Sheet

ROLLER SUPPORT ATTACHMENT FOR WORK BENCHES

FIELD OF THE INVENTION

The present invention relates to an adjustable roller support attachment and more particularly to such an attachment adapted for mounting on a clamping type work bench to facilitate the handling of long or unwieldy stock in stationary power tools and the like.

BACKGROUND OF THE INVENTION

A variety of support devices are generally available for supporting long or unwieldy stock or work pieces being processed in stationary power tools, such as table saws, cut-off saws, radial arm saws, planers, surfacers, routers, shapers, etc. In connection with such power tools, it is commonly desirable to divide a movable support aligned with a table or other portion of the power tool in order to properly position long stock or work pieces on the power tool.

Generally, prior art support products have generally been of two types. A first type was bolted or otherwise attached to the power tool while extending outwardly from a table or other main portion of the tool. Such devices were understandably of limited use since they can only be spaced a relatively short distance from the power tool. Accordingly, they were often incapable of providing the type of support contemplated where necessary to handle long or unwieldy stock or work pieces in the power tool.

Another type of support device was of a freestanding type thus capable of movement relative to the power tool for overcoming the limitation referred to above. The most common freestanding type of support device included a single roller vertically adjustable on a tripod like base. Yet another freestanding support device available in the prior art included one or more rollers forming a top surface for a four-legged table.

Generally, these support devices were relatively bulky and difficult to store, particularly the table type device.

On the other hand, the tripod based support device was more compact and permitted vertical adjustment of the roller. However, for the same reason, the tripod based roller support was also relatively unstable while still presenting the requirement of storage space for the entire roller assembly and tripod base.

Other roller supports have been made available in the prior art for applications other than that specifically referred to above and contemplated by the present invention. For example, various roller designs particularly contemplated for unloading timber or the like from railroad cars were disclosed, for example, by U.S. Pat. No. 937,954 issued Oct. 26, 1909 to Pearson for a "Lumber Loading Mechanism"; U.S. Pat. No. 1,317,079 issued Sept. 23, 1919 to Duckworth for a "Lumber Loading and Unloading Device"; and U.S. Pat. No. 3,092,233 issued June 4, 1963 to Titchenal for a "Flexible Conveyor". The first two patents referred to above provided roller assemblies for mounting on railroad cars for unloading timber or the like. The third patent disclosed a conveyor wherein groups of rollers were contemplated for unloading material for railroad cars or other vehicles and particularly for transporting the materials along a curved path.

None of these conveyors or devices appeared suitable for use with a stationary power tool as described above.

Reference is also made to U.S. Pat. No. 4,328,846 issued May 11, 1982 to Hanson for a "Extension Assembly for a Work Bench" which disclosed an extension assembly adapted for attachment to a clamping type work bench in order to provide an extension for the work bench itself. In this regard, the extension assembly of the above patent is unrelated to the present invention which is intended to provide an independent and adjustable roller support for a stationary power tool. However, the above patent is of interest since it disclosed an attachment or accessory for a clamping type work bench of a similar type as contemplated within the present invention. Accordingly, the above patent is incorporated as though set forth in its entirety herein in order to expand the disclosure of work benches of the type contemplated by the present invention.

In any event, there has been found to remain a need for an adjustable roller support attachment which can be readily stored and employed when desired as an independently movable and stable support attachment with an adjustable roller for facilitating the handling of long or unwieldy stock in stationary power tools. In that regard, the present invention particularly contemplates the handling of long lengths or panels of lumber, plywood and the like in stationary power tools such as those described above.

SUMMARY OF THE INVENTION

It is therefore an object of the present invention to provide an adjustable roller support attachment for mounting on a clamping type work bench to facilitate the handling of long stock in stationary power tools and the like whereby the height of a roller means in the attachment can be vertically adjusted for alignment with a table or other portion of the power tool.

It is a further object of the invention to provide such an adjustable roller support attachment including means for stabilizing the roller support so that it remains properly positioned relative to the stationary power tool during use.

The above objects are preferably accomplished within the present invention by forming the adjustable roller support attachment with a support for mounting a roller means, the support having a wide, elongated base for clamping engagement by the work bench, a stabilizing element surrounding the support base and having a stabilizing surface for resting on the work bench with means for releasably securing the stabilizing element to the support base whereby the stabilizing element assists in stabilizing the support attachment and roller means on the work bench and also facilitating height adjustment of the roller support attachment on the work bench for alignment with a table or other portion of the stationary power tool.

Accordingly, one or more adjustable roller support attachments constructed in accordance with the present invention may be employed with a stationary power tool in the manner outlined above. For example, one or more adjustable roller support attachments may be employed either to support stock or work pieces being fed to the stationary power tool and/or to support stock or material exiting from the power tool.

The adjustable roller support attachment of the present invention offers a number of advantages in comparison with the prior art. Initially, the adjustable roller support attachment of the present invention offers substantial stability since it is adapted for use with a heavy and stable clamping type work bench as disclosed above. Stability is further enhanced because of the configuration of the support base, the stabilizing element and the releasable securing means.

The adjustable roller support attachment of the present invention is also readily adjustable for accurately aligning its roller with a table or other portion of the stationary power tool because of the same combination of elements referred to above. In particular, the stabilizing element can be releasably secured to the support base for accurately positioning the support base in the clamping type work bench and maintaining its alignment with the power tool while the support attachment is being clamped in place on the work bench.

At the same time, the adjustable roller support attachment of the present invention is particularly portable and simple to store since it is an attachment to a work bench already commonly employed in shops or other environments for stationary power tools. Accordingly, it is only necessary to provide storage for the adjustable roller support attachment which can readily be suspended by pegs or other wall type brackets.

The adjustable roller attachment of the present invention is also less costly since it employs an existing work bench in the environment of the stationary power tool. Thus, it is less expensive than other freestanding support devices including their own table or support structure. The adjustable roller support attachment of the present invention also lends itself to simplified construction, for example by molding rather than more costly machining techniques commonly necessary for metal construction in such freestanding devices.

It is yet an additional object of the invention to provide such an adjustable roller support attachment wherein the support includes a yoke element for mounting a cylindrical roller which is rounded or radiused at its axial ends in order to make the adjustable roller support attachment of the invention suitable for use with a wide variety of stock or work pieces being processed by stationary power tools. Accordingly, the attachment of the present invention offers an additional advantage in that it is less likely to mar or damage the stock being processed in the power tool.

The adjustable roller support attachment is preferably described below as being adapted for use in a particular clamping type work bench commercially available under the trademark WORKMATE from the Black and Decker Corporation. The clamping type work bench available under that trademark is a particularly suitable product for supporting the attachment of the present invention because of its substantial weight and wide clamping jaws which provide substantial stability in combination with features of the adjustable roller support attachment of the present invention. However, it is to be understood that the adjustable roller support attachment of the present invention is also capable of use with other clamping type work benches of similar design.

Additional objects and advantages of the invention are made apparent in the following description having reference to the accompanying drawings.

DESCRIPTION OF THE PREFERRED EMBODIMENT

Figure 1:
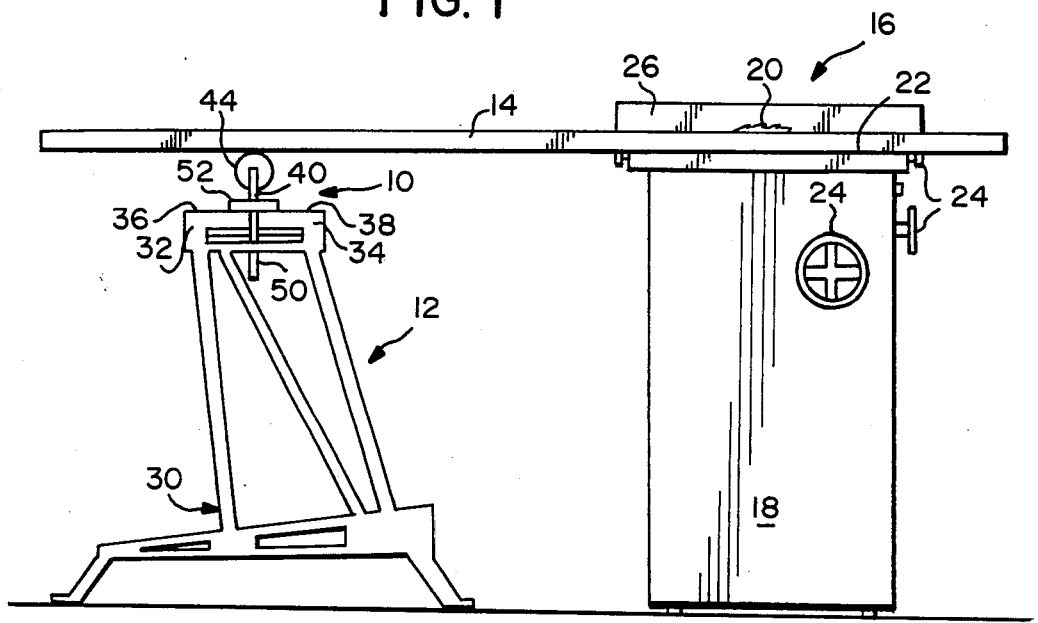
FIG. 1 is a side view in elevation of an adjustable roller support attachment constructed according to the present invention and mounted in a clamping type work bench positioned in spaced apart relation from a stationary power tool for supporting long stock and maintaining it parallel with a table portion of the power tool.

Referring now to the drawings and particularly to FIG. 1, an adjustable roller support attachment is generally indicated at 10 for clamping engagement by a work bench 12 in order to support long or unwieldy stock or work pieces 14 being processed by a stationary power tool such as the table saw indicated at 16.

Particular features of the adjustable roller support attachment are described below with reference to FIGS. 2 and 3. However, the work bench and power tool or table saw 16 are first described with reference to FIG. 1 in order to illustrate the manner in which they cooperate with the adjustable roller support attachment of the invention. It is to be kept in mind that neither the work bench nor the power tool forms a portion of the present invention. Rather, the adjustable roller support attachment 10 of the present invention is adapted for use with a work bench such as that indicated at 12 in FIG. 1. The combination of the adjustable roller support attachment 10 and work bench 12 can then be used to provide an independently movable and adjustable roller support for use with a power tool such as the table saw 16.

It will also be apparent that the adjustable roller support attachment 10 can similarly be employed with other power tools such as those described above. Accordingly, the table saw 16 is described only for the purpose of assuring a complete understanding of the manner in which the adjustable roller support attachment is constructed and employed according to the invention.

The table saw 16 includes a base 18 for supporting a motor-driven saw blade 20. The saw blade 20 is movable, for example, by controls 24, for assuring greater versatility in the table saw. The table saw 16 is also equipped with a fence 26 for positioning stock 14 as it is moved across the table 22 of the table saw 16 to be cut by the saw blade 20.

As noted above, the adjustable roller support attachment 10 is secured in place on a clamping type work bench, preferably of a type available under the trademark WORKMATE available from Black and Decker Corporation as noted above. The work bench 12 includes a folding support structure 30 which can be unfolded into the broad-based, stable configuration illustrated in FIG. 1 or folded into a compact configuration (not shown) for storage. In any event, vise jaws 32 and 34 are movably supported on the support structure 30 in a manner so that they can be moved toward and away from each other in a transverse path of travel as illustrated in FIG. 1.

The vise jaws 32 and 34 are formed with relatively large, planer surfaces 36 and 38 which are aligned with each other to provide a work surface on the work bench.

The vise jaws 32 and 34 are illustrated in FIG. 1 as being moved toward each other for clamping engagement with the adjustable roller support attachment of the present invention as described in greater detail below. Accordingly, reference will be made below to the configuration of the vise jaws 32 and 34 to demonstrate how the construction of the adjustable roller support attachment provides increased stability in combination with the work bench 12. However, still referring to FIG. 1, it is noted that the vise jaws 32 and 34 are substantially elongated both to increase the clamping area between them and also to increase the area of the planar surfaces 36 and 38.

Figure 2:
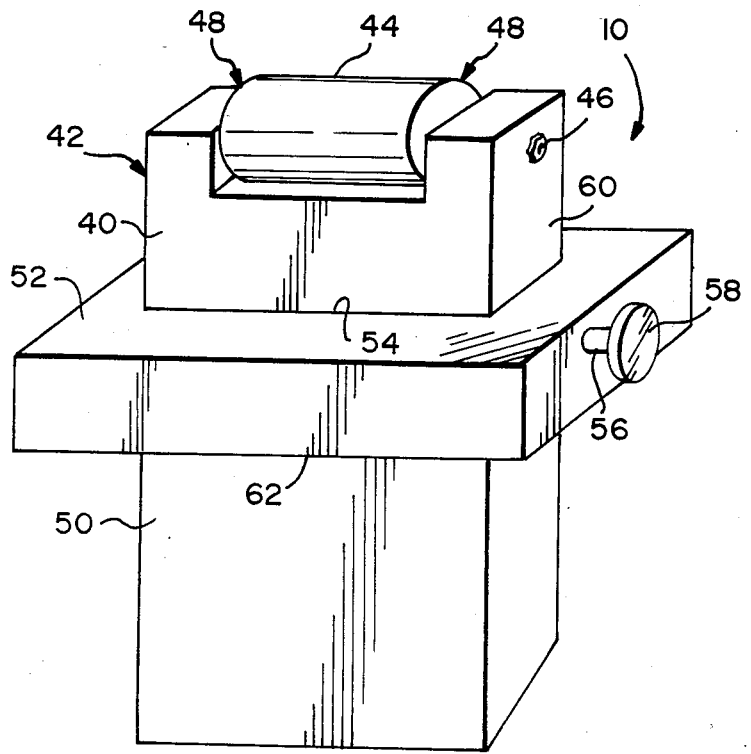
FIG. 2 is a pictorial representation of the adjustable roller support attachment separate from a supporting work bench, the roller support attachment of FIG. 2 being shown somewhat out of proportion to better illustrate its construction.
Figure 3:
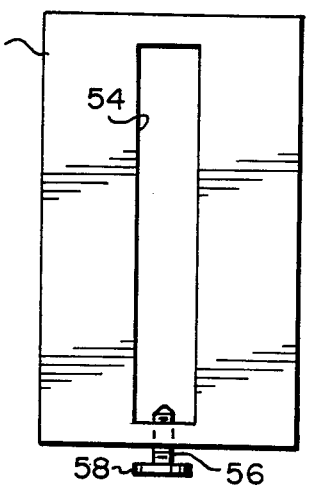
FIG. 3 is a plan view of a stabilizing element or collar and releasable securing means or screw.

Referring now particularly to FIGS. 2 and 3, the adjustable roller support attachment 10 includes a support element 40 having a yoke like construction 42 at its upper end for rotatably supporting a roller 44. The roller 44 is supported within the yoke like portion of the support element by means of an axle or rod 46 extending through the yoke like portion of the support element. The roller 44 is formed as an elongated cylinder from a suitable material such as an elastomer. The axial ends 48 of the roller 44 are rounded or radiused as illustrated in FIG. 2 with the roller estending above the yoke like portion of the support element 40. Thus, the roller 44 is particularly suitable for providing moving support to stock or a work piece as illustrated at 14 in FIG. 1 while preventing the stock from being damaged are marred either from its engagement with the roller 44 or from accidental engagement with the support structure 30.

The support element 40 also includes a wide, elongated base 50 of generally uniform dimension for facilitating positioning of the support element 40 relative to both a stabilizing element 52 and the vise jaws 32 and 34 of the work bench 12 as illustrated in FIG. 1.

The stabilizing element 52 is formed with a rectangular opening 54 for receiving the wide elongated support base 50 in closely spaced relation.

A screw element 56 having an enlarged head 58 threadedly penetrates one end of the stabilizing element 52 for engaging an edge surface 60 of the support base 50. The closely mating relation between the openng 54 and the support base 50 permits the screw element 56 to releasably secure the stabilizing element 52 in any selected position along the length of the support base 50.

With the stabilizing element 52 being secured in place upon the support base 50 by the screw 56, the support base 50 is then lowered between the vise jaws 32 and 34 of the work bench 12 (see FIG. 1) until a bottom surface 62 of the stabilizing element 52 engages the planer surfaces 36 and 38 on the jaws 32 and 34. The support element 40 is then initially positioned on the work bench 12 by the stabilizing element 52 until the vise jaws 32 and 34 are shifted toward each other to grip or engage the support base 50 in the manner illustrated in FIG. 1.

With the jaws 32 and 34 in that position, the adjustable roller support attachment is firmly secured both by engagement of the jaws 32 and 34 with the support base 50 as well as by engagement of the stabilizing element 52 with the planer surfaces 36 and 38 on the jaws. In this manner, the stabilizing element 52 operates in combination with the jaws 32 and 34 to stably secure the support attachment 10 and roller 44 upon the work bench 12.

At the same time, the stabilizing element 52 and releasable screw 56 can be employed to facilitate vertical adjustment of the roller 44. For that purpose, with the jaws 32 and 34 being moved slightly apart from each other to release the roller base 50, the height of the roller can be selected, preferably for alignment with the table 22 of the table saw 16 initially by securing the stabilizing element 52 on the support base 50 by means of the releasable screw 56. With the height of the roller 44 being initially maintained by the stabilizing element 52 and releasable screw 56, the jaws 32 and 34 are tightened against the support base 50 in order to rigidly secure the adjustable roller support attachment 10 on the work bench.

As noted above, the adjustable roller support attachment 10 can be readily remvoed from the work bench 12 when it is no longer needed for use with table saw 16 or other power tools. Because of the small size of the adjustable roller support attachment, it can readily be stored in a workshop or other environment where the power tool 16 is being employed. Thus, the adjustable roller support attachment 10 is immediately available for use when desired.

Thus, a compact roller support attachment has been described which can be employed with a clamping type work bench to provide an independently movable and adjustable roller support for use with a stationary power tool. Various features of the attachment are described above only by way of example. Numerous modifications and variations will be apparent within the scope of the present invention which is accordingly defined only by the following appended claims.

What is claimed is:

1. An adjustable roller support attachment for mounting on a clamping type work bench to facilitate the handling of long stock in stationary power tools, comprising
    a roller means,
    a support for the roller means, the support having a wide, elongated base for clamping engagement by the work bench,
    a stabilizing element forming an opening for receiving the support base, the stabilizing element having a stabilizing surface adjacent the opening for resting on the work bench, and
    means for releasably securing the stabilizing element to the support base whereby the stabilizing element assists in stabilizing the support and roller means on the work bench and facilitates height adjustment of the roller support attachment on the work bench.

2. The adjustable roller support attachment of claim 1 wherein the means for releasably securing the stabilizing element to the support base comprises a screw means threaded through the stabilizing element for engagement with the support base.

3. The adjustable roller support attachment of claim 1 wherein the support base is of generally uniform thickness and substantial width to facilitate its firm attachment or purchase by vise jaws in the work bench, the support base being of substantial length to facilitate height adjustment of the roller support attachment on the work bench.

4. The adjustable roller support attachment of claim 3 wherein the stabilizing element surrounds the base support and forms a surface generally perpendicular to the support base for resting on upper surfaces of the vise jaws.

5. The adjustable roller support attachment of claim 4 wherein the means for releasably securing the stabilizing element to the support base comprises a screw means threaded through the stabilizing element for engagement with the support base.

6. The adjustable roller support attachment of claim 4 wherein the support comprises a yoke for rotatably mounting the roller means, the roller means being an elongated cylinder for supporting the stock, the support attachment being adjustable on the work bench for positioning the elongated cylinder in alignment with a portion of the stationary power tool.

7. The adjustable roller support attachment of claim 6 wherein end portions of the cylinder are rounded or radiused to prevent damaging of the supported stock.

8. The adjustable roller support attachment of claim 1 wherein the support comprises a yoke for rotatably mounting the roller means, the roller means being an elongated cylinder for supporting the stock, the support attachment being adjustable on the work bench for positioning the elongated cylinder in alignment with a portion of the stationary power tool.

9. The adjustable roller support attachment of claim 8 wherein end portions of the cylinder are rounded or radiused to prevent damaging of the stock.

* * * * *